(12) United States Patent
Reilly et al.

(10) Patent No.: US 9,041,898 B1
(45) Date of Patent: May 26, 2015

(54) APPARATUS AND METHOD FOR SIMULTANEOUS PLURAL-VIEW IMAGE SEQUENCES FROM A SINGLE IMAGE SENSOR

(75) Inventors: Tom Reilly, Tucson, AZ (US); Paul Eason, Healdsburg, CA (US); David Kane, Tucson, AZ (US); Tony Pittner, Tucson, AZ (US); Kelly Hillman, Tucson, AZ (US); Christopher Hornberg, Tucson, AZ (US); John Hunt, Tucson, AZ (US); Andrew E. Paul, Tucson, AZ (US); Philip A. Selwyn, Falls Church, VA (US)

(73) Assignee: Arete Associates, Northridge, CA (US)

( * ) Notice: Subject to any disclaimer, the term of this patent is extended or adjusted under 35 U.S.C. 154(b) by 1153 days.

(21) Appl. No.: 12/661,053

(22) Filed: Mar. 9, 2010

Related U.S. Application Data

(63) Continuation-in-part of application No. 12/287,881, filed on Oct. 14, 2008.

(60) Provisional application No. 61/209,799, filed on Mar. 10, 2009, provisional application No. 60/999,159, filed on Oct. 15, 2007, provisional application No. 61/125,915, filed on Apr. 30, 2008.

(51) Int. Cl.
*H04N 7/18* (2006.01)
*H04N 19/177* (2014.01)

(52) U.S. Cl.
CPC .................. *H04N 19/177* (2014.11)

(58) Field of Classification Search
USPC ............. 352/39, 44; 348/106, 105, 107, 143, 348/144–147
See application file for complete search history.

(56) References Cited

U.S. PATENT DOCUMENTS

| | | | |
|---|---|---|---|
| 5,999,211 A * | 12/1999 | Hedges et al. | 348/144 |
| 8,315,525 B2 * | 11/2012 | Cunningham | 398/96 |
| 8,325,082 B2 * | 12/2012 | Rudnisky et al. | 342/73 |
| 2010/0245571 A1 * | 9/2010 | DeVoe | 348/145 |
| 2011/0085034 A1 * | 4/2011 | McDonald et al. | 348/143 |
| 2012/0105634 A1 * | 5/2012 | Meidan et al. | 348/143 |

\* cited by examiner

*Primary Examiner* — William C Dowling
(74) *Attorney, Agent, or Firm* — Furman IP Law

(57) ABSTRACT

Simultaneous movies of plural portions of a scene are acquired and shown, using one imager with electrooptical directing device to acquire, stepwise, an interleaved (e. g. alternating) sequence of subscene images. Apparatus is ideally in a vehicle: airborne or unmanned, or both. The invention records and transmits (via one data link, with no needed parallel path) the sequence as one image series; best sorts the received sequence into noninterleaved sequences, a separate sequence for each subscene; and shows these as movies. Alternatively, scene portions form a mosaic. Including gyro operation and pointing, the device best gets a new image roughly each 5 to 40 msec or less; or excluding gyros and pointing, 5 to 40 msec by FSM, 1 to 5 by MEMS, 1 to 5 (or 10) by LC, 1 by 2-axis nongimbal scanner and 0.1 to 0.2 by digigimbal. Subscene direction and focal changes best synchronize with frame reception. FSMs best have refractory bearings and electromagnetic pointing.

19 Claims, 12 Drawing Sheets

APPARATUS AND METHOD FOR SIMULTANEOUS PLURAL-VIEW IMAGE SEQUENCES FROM A SINGLE IMAGE SENSOR

RELATION-BACK

This patent document claims priority of U.S. Provisional Patent Application 61/209,799, filed Mar. 10, 2009. The present patent document is also a continuation-in-part, and accordingly claims priority, of nonprovisional U.S. patent application Ser. No. 12/287,881, filed Oct. 14, 2008—which in turn claimed priority of U.S. Provisional Patent Applications 60/999,159 and 61/125,915, filed Oct. 15, 2007 and Apr. 30, 2008, respectively. We hereby wholly incorporate by reference, into this present application, all four of the applications just mentioned. We have substantially copied into this present document certain parts of the precursor '881 application, and reserve the right to likewise copy hereinto all or any part(s) of any of the four applications just mentioned.

Also hereby wholly incorporated by reference herein is coowned U.S. patent application Ser. No. 12/387,171, relating to a so-called "roving foveal camera". The inventors in that patent application are coemployees of the assignee in the present matter. We do not claim any priority benefit arising from that application.

FIELD OF THE INVENTION

This invention is generally in the field of intelligence, surveillance and reconnaissance ("ISR")—and, more specifically, in method and apparatus for enabling a single imaging sensor to generate and provide a substantially continuous plural-channel image sequence. The invention is particularly useful in the context of unmanned vehicles equipped for ISR.

BACKGROUND

Conventional ISR equipment, ordinarily mounted in a small airborne vehicle that is unmanned, often commands a view over a large area—a scene readily encompassing, for example, several square miles. An image of the huge scene, perhaps looking generally in the direction in which the craft is going, is very often sent by radio to control facilities very far away—although of course the facilities and operators can be very close by.

The remote operators can see, unfortunately, only one such view. They cannot concurrently see, for instance, an equally large view looking off to one side, or to the rear (i. e., opposite the direction of travel).

Alternatively such equipment, if instead operating with an extreme telephoto lens, can instead provide a closeup of a very small, interpersonal event, perhaps looking forward and to the left—a different kind of scene, but having an important characteristic in common with the view first described: each of them is only a single scene. The remote operators can see the enormous, broad view, or the closeup, or can perhaps see where the craft is going, but they cannot see more than one of these disparate scenes at a time.

This characteristic constitutes an extreme hindrance to optimum use of the apparatus. While control operators' attention is fixed on one view of the scene, they cannot clearly discern what critical personal events are occurring within that scene—perhaps in not just one but several or even many very small areas.

They cannot provide fine guidance to the craft, such as might be essential to maneuver it into an important but tightly constrained region: a very narrow canyon, or a very shallow space between floors of a building (e. g. levels of a bridge), or an open window. In short, the usefulness of such a great variety of different scenes is very greatly diminished when only one of the scenes can be seen at a time.

Additional Known Invention:

The foregoing paragraphs discuss what could be called "traditional" background. We are aware of another kind of invention that is not due to ourselves but rather—as already noted in the "RELATION-BACK" section of this document—to certain of our colleagues.

In that innovation, an ISR imaging system is provided with an auxiliary or secondary optical path—more specifically, a second optical input path, that is tapped into the main optical input path (e. g., by means of a partially transmitting beam splitter, or a rotating chopper mirror). One or both of the input paths is preferably provided with a variable-zoom capability, e. g a variable-focal-length lens—so that the two images collected by the device can have distinctly different and in fact controllably different magnifications (or minifications).

That "roving foveal" system offers the remarkable ability to collect and display, from what is essentially a single optical apparatus, images of two portions of an overall field of regard ("FOR")—one of which images is at a much greater enlargement/reduction than the other. In pondering that invention we have come to realize that it can suffer from some of the same limitations that we have introduced above for the "traditional" prior art.

In particular, both the images collected by the roving foveal camera are limited by the very fact that they are only two images. As suggested above, it would be much preferred to have a greater number of images—e. g. four, or a dozen, or more. The roving foveal camera as disclosed in its referenced '171 application seems not capable of providing such a multiplicity of images.

Conclusion, as to Background:

The prior art represents truly remarkable achievements on the part of earlier innovators, including our own colleagues. At the same time, however, the above discussions make clear that the prior art of both types also has left ample room for extremely important refinements.

SUMMARY OF THE DISCLOSURE

The present invention provides exactly such refinements. More specifically, the present invention has several major aspects or facets that are amenable to practice together, in combination—but also can be practiced individually, and at least in part independently of one another.

Considering the physics of image detection and acquisition, we deem it more precise to reserve the word "collect" to describe the process of photons arriving at a sensor (such as a CCD), and the response of the sensor to those photons. Accordingly, for referring to the process of deflecting optical beams toward the sensor we use—as will be seen—other words such as "point" or "direct", or "steer".

In preferred embodiments of its first major independent facet or aspect, the invention is apparatus for acquiring and displaying substantially simultaneous motion-picture images of plural portions of a scene. By the phrase "motion-picture images" we do not intend to be limited to the format, or apparatus, or frame rate, or traditional appearance of theater "movies". Rather we only mean images that when viewed by a person impart a sense of motion in a scene or scenes viewed.

The apparatus of this first facet of our invention includes only a single imaging sensor. It also includes at least one stepping device that is a fast electrooptical pointing or "directing" (or "steering") device to receive and redirect to the sensor plural subscene images from corresponding different viewing directions.

We refer to this component as a "stepping" device because its function particularly includes stepping in turn from one subscene to another—so that the sensor receives image data from all the desired and selected subscenes, preferably one at a time, in a sequence. The concept of a "fast" directing device is specifically defined by reference to the specific frame rates and process times indicated in this document, in this section and particularly in the appended claims. Those rates and times in turn are detailed in the "Detailed Description of Preferred Embodiments" section, presented shortly.

In addition the apparatus includes some means for providing data from the sensor, for the subscene images, via a single data link with no requirement for a parallel path, as a single series of images. (Alternatively the providing means can include means for recording the subscene images.)

The apparatus of this first aspect of the invention also includes some means for automatically sorting the single series of images into corresponding plural noninterleaved separate sequences of images, including essentially a separate sequence for each subscene. (As a practical matter, this step most typically is performed at a remote station, rather than in the same platform or place as the stepping/directing device.) The apparatus still further includes some means for separately displaying each of the plural separate sequences as respective motion-picture images of the subscenes.

The foregoing may represent a description or definition of the first aspect or facet of the invention in its broadest or most general form. Even as couched in these broad terms, however, it can be seen that this facet of the invention importantly advances the art.

In particular, it is a piece of equipment that is quite modest in size, weight, power drain and cost—yet it eliminates the problem of remote operators' inability to see in more than one direction at a time from a surveillance vehicle—but without expanding the requirement for the number (one) of either sensors or data-transmission links. In fact this aspect of the invention enables operators to see in a sizable number of different directions simultaneously, as desired.

Although the first major aspect of the invention thus significantly advances the art, nevertheless to optimize enjoyment of its benefits preferably the invention is practiced in conjunction with certain additional features or characteristics. In particular, preferably the apparatus also includes some means for introducing variation in focal length; and, with that, some means for operating these "introducing means" in synchronism with operation of the stepping optical device, as appropriate for distance to each new subscene.

In preferred embodiments of its second major independent facet or aspect, the invention is apparatus for acquiring and displaying substantially simultaneous motion-picture images of plural portions of a scene. The apparatus includes a single imaging sensor.

It also includes a fast image-directing or "pointing" device automatically addressed to successively different viewing directions, to form and direct to the sensor a series of successive images of (or successive signals representing images of) scene portions from the different viewing directions respectively. The sensor responds with a series of successive signals representing the successive images. The apparatus also includes some means for mounting the sensor and device in a vehicle.

The fast image-directing device directs to the sensor images for interleaving, and is one of the following devices. Again, the word "fast", as used in this document when referring to a directing or pointing device, is defined by reference to times and rates—which are in turn discussed in detail in the "Detailed Description of Preferred Embodiments" section. In fact the operating speeds of these devices, in the aggregate, both exemplify and define what we mean by "fast" image-directing device:

Note—Here the time periods recited exclude operation of gyros and generation of external pointing commands.

a fast scan mirror ("FSM") to direct to the sensor a new image approximately each five to forty milliseconds or faster, an electronically steered, high-speed windowing sensor ("digital gimbal") to direct to the sensor a new image roughly each one hundred to two hundred microseconds or faster, a microelectromechanical ("MEMS") steering mirror or array, to direct to the sensor a new image approximately each one to five milliseconds or faster, a liquid-crystal beam-steering device having no moving parts, to direct to the sensor a new image approximately each one to five (or possibly one to ten) milliseconds, or faster; and a gimbal-less two-axis fast scanning micromirror, to direct to the sensor a new image approximately each millisecond or faster.

The foregoing may represent a description or definition of the second aspect or facet of the invention in its broadest or most general form. Even as couched in these broad terms, however, it can be seen that this facet of the invention importantly advances the art.

In particular, the advantages of this second facet are generally the same as stated above for the first facet of the invention. This second aspect of the invention, however, expressly offers a variety of operating-speed capabilities, combined with other operating characteristics, respectively.

These variegated operating conditions can be brought to bear in situations that call for (merely by way of example) special ultrafast stepping between subscenes, with allowance for extraordinary viewing conditions. For instance, spectral peculiarities or other ambient lighting demands can complicate acquisition of interleaved subscene sequences, but the special properties of the several enumerated devices can resolve some of such complications.

Although the second major aspect of the invention thus significantly advances the art, nevertheless to optimize enjoyment of its benefits preferably the invention is practiced in conjunction with certain additional features or characteristics. In particular, preferably the apparatus also includes some means, responsive to the signals, for separately displaying each of the plural separate signal sequences from the sensor, as respective motion-picture subscene images at the different directions.

Another preference is that the fast steering mirror have refractory bearings, and electromagnetic controls for setting the viewing directions of the addressed device in successive frames. Still another preference is that the apparatus also include some means for forming a mosaic from the acquired scene portions.

Yet other preferences are that the vehicle be an airborne vehicle—i. e., an airborne type of vehicle, though not necessarily airborne at all times—and that the vehicle be an unmanned vehicle.

In preferred embodiments of its third major independent aspect or facet, the invention is a method for acquiring and displaying substantially simultaneous motion-picture images of plural portions of a scene, using substantially only a single imaging sensor and a fast electrooptical directing device. The concept of a "fast" directing device is defined by reference to the specific frame rates indicated in this document, above and particularly in the appended claims.

The method includes the step of automatically operating the fast electrooptical directing device, stepwise, to acquire a sequence of interleaved plural subscene images, thereby subdividing the scene into the plural subscene images. This method also includes the step of providing the interleaved sequence, as a single series of images, for subsequent use.

Another step of the method is transmitting the interleaved sequence, as a single series of images, via only a single data link with no requirement for a parallel path, for subsequent use. Yet another step is automatically sorting the provided single interleaved image sequence into corresponding plural noninterleaved separate sequences of images, including substantially a separate sequence for each subscene.

Still another step is separately displaying each of the plural separate sequences as respective motion-picture images of the subscenes. (Again the reference to "motion-picture images" is not meant to connote any particular technology, image format or the like.)

The foregoing may represent a description or definition of the third aspect or facet of the invention in its broadest or most general form. Even as couched in these broad terms, however, it can be seen that this facet of the invention importantly advances the art.

In particular, this aspect of the invention extends into the method regime the valuable advantages enumerated above for apparatus aspects of the invention.

Although the third major aspect of the invention thus significantly advances the art, nevertheless to optimize enjoyment of its benefits preferably the invention is practiced in conjunction with certain additional features or characteristics. In particular, preferably the operating step includes operating the fast electrooptical directing device to yield a new image, for interleaving, approximately each five to forty milliseconds or faster, including time for operation of gyros and external pointing commands.

Another preference is that the operating step include operating the fast electrooptical directing device—taking the form of a fast scan mirror with refractory bearings (or "FSM")—to direct to the sensor a new image, for interleaving, approximately each five to forty milliseconds or faster. An alternative preference is that the operating step include operating the fast electrooptical directing device—in the form of an electronically steered, high-speed windowing sensor ("digital gimbal")—to direct to the sensor a new image, for interleaving, approximately each 100 to 200 microseconds or faster.

Another alternative preference is that the operating step include operating the fast electrooptical directing device— taking the form of microelectromechanical ("MEMS") steering mirror or array—to direct to the sensor a new image, for interleaving, approximately each one to five milliseconds or faster. Still another alternative preference is that the operating step include operating the fast electrooptical directing device—in the form of a liquid-crystal beam-steering device—to direct to the sensor a new image, for interleaving, approximately each one to five (or possibly one to ten) milliseconds or faster.

In yet another preference, the operating step uses the fast directing device in the form of a gimbal-less two-axis fast scanning mirror. The operating step here includes operating the fast electrooptical directing device to direct to the sensor a new image, for interleaving, in roughly one millisecond or less.

This method aspect of the invention has additional preferences: in one, there are two subscenes; and the operating step includes subdividing the scene into a sequence of images, alternating between the two subscenes; and the sorting step comprises sorting the alternating sequence into two nonalternating sequences, including a separate sequence for each subscene.

In an alternative preference, which is a simple extension of the two-scene method above, there are "n" subscenes, n being a positive integer equal to two or greater. The operating step includes subdividing the image data into a sequence of images, stepping, in turn, among the n subscenes; and the sorting step includes sorting the interleaved image sequence into n noninterleaved image sequences, including a separate sequence for each subscene.

In another preference, which in general can be combined with those described above, the subscenes are in mutually different viewing directions; and the method further includes the step of—for each subscene—synchronizing each change of viewing direction with image frame reception by the stepping optical device.

If this preference obtains, then a subpreference is applicable, namely—for each subscene—synchronizing each change of viewing direction with a change in focal length as appropriate for distance to the subscene. This mode of operation is somewhat related to an invention mentioned earlier, the so-called "roving foveal camera".

BRIEF DESCRIPTION OF THE DRAWINGS

FIG. 16 is in part a copy of another drawing (FIG. 18) from the FSM patent application, but with additional detail added to illustrate one manner of merging of the "roving foveal camera" with the present SimulView invention.

DETAILED DESCRIPTION OF THE PREFERRED EMBODIMENTS

Figure 1:
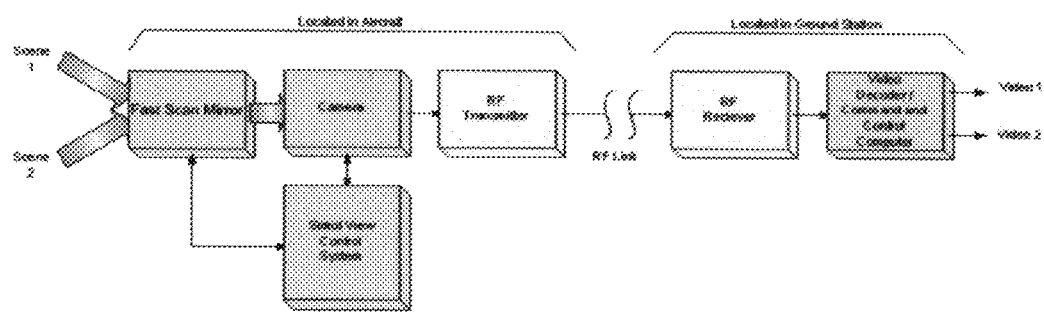
FIG. 1 is a block-style flow chart showing generation of plural video streams by the sensor system of our "SimulView" invention, in an unmanned airborne vehicle ("UAV")

Preferred embodiments of our invention free ISR equipment from the onerous limitation of being able to image only one scene at a time. In effect the present invention enables ISR imaging equipment to subdivide a very broad scene into two or more—or even many—subscenes.

The apparatus transmits all of the subscenes, interleaved to form a single data stream, typically to an operator facility. There the subscenes can be reassembled into separate, substantially simultaneous image streams, to the operators. If preferred, the single or simultaneous image data can be fed to local apparatus that records the plural image streams for viewing or analysis later.

Image streams can be displayed on a corresponding set of plural video monitors; or instead can be displayed together, sharing a single monitor, with each image sized to best exploit its respective amount of detailed information content to be viewed. Either way, the operators can see a substantially continuous video of each of the several subscenes.

What is desired is a moving picture from each subscene, essentially in real time. The phrase "moving picture", however, is not meant to necessarily imply film, or traditional image aspect ratios, or traditional frame rate—only to imply "images that appear to show movement".

Our system diagram with an FSM used as the fast directing device (FIG. 1) shows one preferred embodiment of our invention. As will be understood, however, this embodiment also is simply exemplary of other forms of the invention that instead use other components as the fast directing device.

In general the several forms of our invention operate by first "pointing" (FIG. 1A) to the desired viewing direction, and "directing" to the sensor—i. e., focal-plane array—the subscene image found there.

The sensor array next accumulates or "integrates" the energy received from that particular subscene direction. Here the term "integrate" corresponds to the process of the sensor, in receiving optical energy over a time period sufficient for formation of a usable, easily perceptible image for display.

The apparatus then repeats these two steps, pointing and integration, alternating the viewing direction at each successive frame. If there are multiple subscenes to be viewed, then instead of "alternate" the system may be said to "interleave" the subscenes (with their corresponding viewing directions). Once a frame has been integrated, the sensor must "read out" each pixel before it may again begin to integrate.

As the diagram makes clear, pointing (and directing) for a subsequent subscene/frame can occur during readout of an already integrated frame. Many timing variations are possible, as may be gathered from the unused blank (white) portions of the periods nominally reserved for pointing. Most such variations will be plain to people skilled in this field.

As suggested by the diagram, frame rate is driven (controlled) by pointing time or readout time, whichever is longer. The table below shows typical times in milliseconds and frame rates in hertz, for the different directing devices.

As the table makes clear, unless the steering device is significantly slower than the readout time the upper bound of the frame rate is limited by the sum of the readout and integration times. The conditions tabulated can be modified if, e. g., faster focal-plane array technology is used, and faster readout times become possible as the technology improves. If significantly slower readout times—or longer integration times—are used, the table shows that the effects of the fast directing devices become less important.

| | Timing, and frame rates | | | | | | | | | |
|---|---|---|---|---|---|---|---|---|---|---|
| | FSM | | dig. gimbal | | MEMS | | LC | | gimballess | |
| qty. | min. | max. | min. | max. | min. | max. | min. | max. | min. | max. |
| point | 5 | 40 | 0.1 | 0.2 | 1 | 5 | 1 | 5 | <1 | 1 |
| integrate | 2 | 2 | 2 | 2 | 2 | 2 | 2 | 2 | 2 | 2 |
| read out | 25 | 25 | 25 | 25 | 25 | 25 | 25 | 25 | 25 | 25 |
| frame time | 25 + 2 | 40 + 2 | 25 + 2 | 25 + 2 | 25 + 2 | 25 + 2 | 25 + 2 | 25 + 2 | 25 + 2 | 25 + 2 |
| frame rate | 37 | 23 | 37 | 37 | 37 | 37 | 37 | 37 | 37 | 37 |

From these data our single most-important conclusions are that very fast directing/steering devices are critically important to usefulness of our invention—but it does not matter (or does not matter much) exactly how fast they are, provided only that the desired frame rate is not compromised by inadequate directing-device speed. Few directing-device types are actually fast enough, and we believe that essentially all of those are enumerated in this document. They are in fact wonderfully fast. Thus our invention works because of these pointing devices.

Simultaneous-Viewing Sensor, Overview

Our simultaneous-viewing sensor (for which we have adopted the trade name "SimulView™ sensor") consists of a rapid stepping device, which successively addresses different subscenes (FOVs) of the overall scene (field of regard) for direction to our imaging sensor. The stepping device may be:

a fast scanning or "steering" mirror ("FSM")—described in a coowned patent application (Ser. No. 12/287,881, filed Oct. 14, 2008, and its precursor provisional application)—or equivalents, such as so-called "digital gimbals", discussed later in this document—coupled with a special control system, triggered camera, optics, and specialized video decoding system; or specialized microelectromechanical ("MEMS") mirrors or mirror arrays; or liquid-crystal beam-steering devices; or other fast image-directing devices such as the so-called "gimbal-less two-axis scanning micromirrors" from Adriatic Research.

For actual design and practice of our invention, a number of relatively obscure practical facts are needed. A major part of the effort and cost in making our invention has gone to assembling these facts, and we accordingly endeavor to fully introduce them in this document.

For example, all the devices just enumerated have the capability (to varying degrees) to acquire a subscene image and move on to the next subscene in remarkably short time periods, as detailed later in this document. Yet comparing the temporal performances of these and other known fast-stepping devices is not entirely straightforward.

It is necessary e. g. to take into account not only the time for "pointing" (defining boundaries of a subscene to be imaged) and for acquiring an image (providing photons to each pixel, to establish a corresponding data level at each pixel)—but also the time for less-familiar processes such as operation of inertial devices ("gyros") to establish absolute location on or over the Earth, for each subscene.

For example some "digital gimbal" devices can "point" two orders of magnitude faster than our FSM. Yet overall, in the present state of the art, they are not faster in the least—if image acquisition and inertial measurements are considered.

Any of the enumerated fast stepping devices can function as part of our invention by virtue of being fast enough to direct subscene data that—after reassembly of the successive data streams for any of the subscenes—can generate a continuous-appearing video at each subscene. Based upon discussion elsewhere in this document, however, it will be seen that at present not all the mentioned devices are sufficiently advanced in development to provide a fully operational overall simultaneous-viewing system.

Such equivalents to the FSM can be either mechanical or electrical, or even purely optical. The commonality among them is very high speed, and the ability to interleave virtually simultaneous image sequences. These practical characteristics are crucial to completion of our invention: without them, the invention would be of relatively limited value in modern ISR work.

Embodiments of our invention utilizing an electronically steered field of view (the so-called "digital gimbals" mentioned above), or liquid-crystal steering, or Adriatic "gimbal-less two-axis scanning micromirrors, or MEMS mirrors, are described in this document. Our present SimulView sensor can generate a single video stream observing one scene, or multiple streams observing multiple subscenes, or still images that may or may not be adequate for forming mosaics (observing a wide field of view), or any combination of such video streams and still images.

When our sensor invention is used with an FSM to generate a single video stream, the control system instructs the FSM to address (i. e. point the sensor to receive images from) a specific target or, more accurately, subscene (i. e. a specific pointing angle within the field of regard of the mirror)—and triggers the camera repeatedly to generate a video stream commensurate with the field of view of the camera and optics.

The video decoding system receives a resulting video stream and uses it, generally without modification, to display the selected subscene.

When our invention is used to instead generate multiple video streams, the control system instructs the FSM to move between or among specific subscenes, and triggers the camera to record an image at each subscene location. This process is performed repeatedly, generating a succession of interleaved images, one series or "stream" for each subscene. The video decoding system receives the resulting succession of images, and recreates multiple video images, one stream for each selected subscene.

The sensor of our invention is strikingly unlike conventional sensors, in that it uses a single camera (imaging sensor) to record multiple videos or mosaics, and all the videos are substantially simultaneous: at least concurrent. The sensor of our invention has the ability to step—or "jump"—from subscene to subscene, in essence as quickly as the camera can acquire an image.

Multiple video streams, as they are acquired, are thus initially interleaved into a single sequence, but then decoded from the single camera and sorted to form separately viewable, essentially independent video streams. As noted earlier, different stepping/sampling devices use different physical processes—with often-startling differences in time required per subscene. An important part of our invention consists of appreciating and manipulating these differences.

A conventional sensor, by comparison, lacks the adequately fast FSM (or equivalent) and synchronized camera that can collect data from multiple subscenes substantially simultaneously so as to make up our invention. Such a conventional sensor must "stare" at a scene long enough for the operator to interpret the scene and comprehend the actions seen.

The conventional system must then switch to the next scene and again stare long enough for the operator to interpret this new scene. The process must iterate for whatever number of scenes is being monitored. Such a scenario cannot provide persistence on any single scene, and therefore easily loses critical information (such as for example a vehicle entering or leaving a scene).

Our inventive sensor instead captures concurrent video of all the subscenes—substantially simultaneous, and continuous—affording an operator a virtually uninterrupted view of each subscene that the sensor records. Though it is possible to obtain persistent video with conventional imaging sensors, doing so requires installation of separate cameras, lenses and video paths—typically one set of such equipment per subscene.

Sensing with our invention offers a significant advantage when an operator wishes or needs to observe multiple subscenes continuously—using a very compact, space-efficient envelope and platform, and using very limited payload weight and from a very limited supply of power. Such applications exist in, for example, small unmanned vehicles ("UAVs").

The operator or operators of such a vehicle may be quite nearby, or may be on another continent. They would like to see where the vehicle is going, while observing a region of strategic interest—e. g., a "target" or subscene—and simultaneously obtaining very broad-area situational cognizance. Again, such a vehicle has onboard very limited space, weight-carrying capability, and electrical supply power, and most often only a single video-stream interface; and likewise has restricted capability for carrying added weight and supplying added power. The system of our invention adds considerable mission capability to such vehicles.

Figure 2:
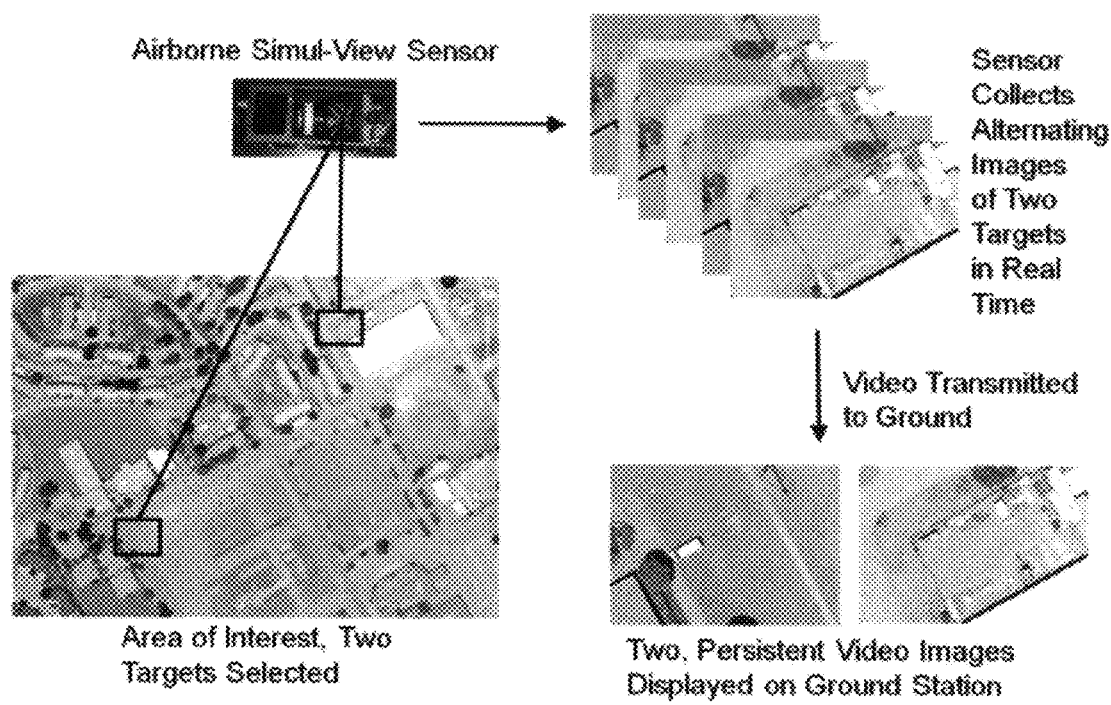
FIG. 2 is a flow chart, with photographic elements, showing plural subscenes in an area of interest assembled into an alternating video stream—and later disassembled to provide persistent plural video streams in (most typically) a remote station.
Figure 1A:
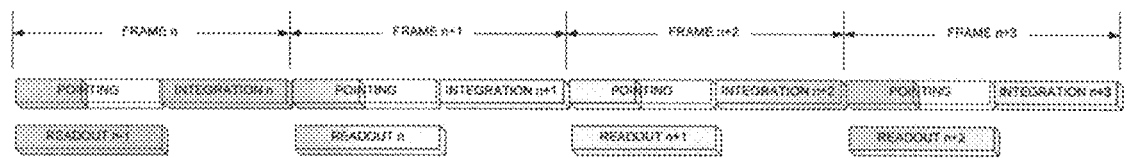
FIG. 1A is a diagram showing pointing, integration and readout of subscenes into and from the imaging sensor that is part of our invention.

The components of our invention are typically mounted in an unmanned airborne vehicle ("UAV") application, in which the system generates e. g. two video streams (FIG. 1). In this configuration the FSM, camera, and control system are located in the UAV. In this particular example the generated images are sent via radio-frequency transmission to a ground station: there a radio-frequency receiver presents them to the Video Decoder/Command and Control Computer. The Video Decoder provides two conventional video feeds, one for each subscene. Command and control are provided by this computer to steer the looking angles for the FSM and provide general system configuration. We include a pictorial of this process (FIG. 2) operating in the FIG. 1 UAV application.

When our sensor invention is used to generate an array of still images, the control system instructs the FSM or equivalent stepping device to address a specific target location and trigger the camera to take one or more pictures. The Video Decoder/Command and Control Computer receives the resulting succession of images and metadata containing pointing information for each image, and either stores the images or creates a mosaic of them based on the metadata. This latter process uses the same components shown (FIG. 1), but a different mode of control in the SimulView control system.

It is possible to combine the operation of single and multiple video streams, with the array of still images providing motion video for targets of interest and wide-field-of-view arrays of still images that may be grouped to form a mosaic image. The system of our invention has these attributes that are unique to this approach: considerable reduction in size, weight and power relative to conventional gimbaled sensors, improved situational awareness when mosaic images are created, creation of one or more video streams; and ability to perform persistent surveillance over a very large region.

Fast Scanning Mirror (FSM)—

The above-mentioned FSM serves excellently as a major part of our invention, to step and sample among subscenes to create an interleaved sequence of image streams that is transmitted over a single radio link—for reassembly elsewhere to display simultaneous separate videos. For definiteness, some of the FSM components and mechanical design set forth in our earlier-mentioned patent applications are included near the end of this document.

The FSM is able to step very sharply between or among plural or multiple subscenes, to provide the appearance or effect of substantially continuous coverage, in the video stream for each subscene. Our invention, however, is not limited to practice with that FSM.

It can instead be practiced using any of a great number of other camera and lens-steering technologies—some of which are also discussed near the end of this document. They have attributes analogous to those of the FSM, and required for our invention to function. In particular these attributes include:

not only the ability to select the optical path (more precisely, the FOV) for the camera abruptly, stepwise, to select specific preestablished subscenes in turn without objectionable delay or wasted time—but also to then remain in a very stable, optically quiescent condition for optical acquisition of each of those subscenes in turn.

Figure 3:
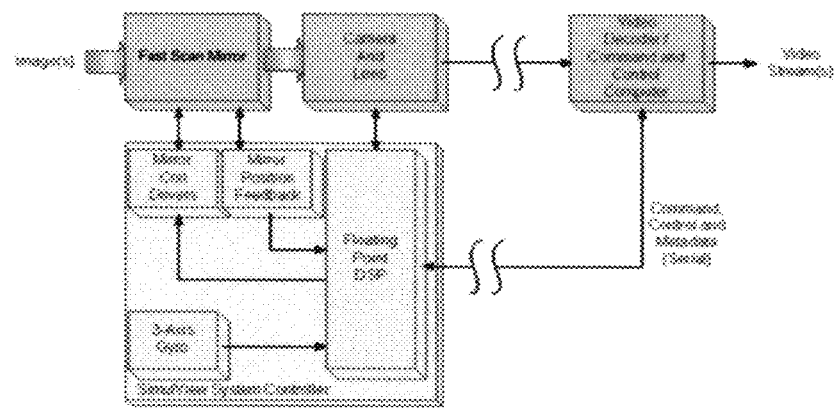
FIG. 3 is a block diagram of the system, including a fast scan mirror ("FSM")

System Architecture, Based Primarily on the FSM:

In preferred embodiments of our invention, the system architecture consists of four components (FIG. 3). The SimulView System Controller is a printed wiring assembly that provides control electronics and software for the FSM (or equivalent fast directing device such as those introduced in this document) and its drivers and interfaces, including onboard electronics for driving motor coils and sensing the angular position of the mirror.

Software resident on the System Controller's floating-point digital signal processor ("DSP") contains the control algorithm responsible for pointing angles and line-of-sight stability of the FSM. We prefer that the camera and lens subsystem be a commercial, off-the-shelf ("COTS") camera, controlled by the Controller, and a custom lens.

People skilled in this field will appreciate that components which are COTS in one era or one marketplace may e. g. not be available at all in a different timeframe, or place—or conversely may be substandard, in a different such place or time. Our point here, however, in prescribing COTS hardware, is not any attempt to "standardize" optical-system requirements of optical front-end apparatus for our invention. Rather—very much to the contrary—front-end optics for use in our invention need not satisfy any particularly stringent demands. Components generally deemed state-of-the-art in any professional context, time and place are likely to serve.

The Video Decoder/Command and Control Computer is typically a directly or remotely attached computer that decodes the video stream, issues command and control to the System Controller of our invention, and receives and synchronizes metadata. Often, this computer is combined with a user interface (e. g. a mouse, touchpad or joystick) that is used for steering the "look" angle of the FSM, selecting the mode of operation, or displaying operational information.

The Video Decoder may be collocated with our System Controller, remotely (as shown), or as a postprocess tool to decode imagery that has previously been recorded for future analysis. It is even possible to combine, within our System Controller itself, all the functions of the Video Decoder/Command and Control Computer.

Control Algorithm, Most Particularly for the FSM:

A very-high-level view of our preferred control-system software for use with the FSM shows the program running on our System Controller floating point DSP—implemented in hardware. Some sections 110 (FIG. 4) of the program are implemented in the floating-point DSP. Other sections 111 are implemented in hardware on our System Controller, and still other sections 112 are physical features of the FSM.

Position-Control Loop—

The angle of the FSM, and thus the position of the subscene that the FSM passes to our sensing detector is controlled by an angular-position control loop; not all of the equivalent fast-directing devices mentioned in this document require such a control loop. The angular position of the FSM is measured by reflecting a laser at the back surface of the FSM (in the right end of block entitled "Mirror") and onto a PSD, in the bottom of block entitled "PCB Circuit").

The PSD is then read by analog-to-digital converters, converted to angles (bottom of block entitled "DSP Software") and subtracted from the reference (or "desired") angles $\theta_{ref1}$, $\theta_{ref2}$, etc. to find the error. In accordance with our invention the system can accept plural desired angles $\theta_{ref1}$, $\theta_{ref2}$, etc. of view, and visit each view angle and corresponding subscene in turn numerous times as appropriate.

Our preference is to custom-set the overall repetition rate $f_{ref}$ of this procedure as appropriate for the mission at hand. For each view angle and subscene the calculated error is used by the Angular Position Controller to determine how to change the velocity reference to the velocity loop.

Changing the velocity reference then produces a change in angular velocity and position. The position loop preferably receives reference from a Function Generator module (left end of block)—responding to input desired angles 1 and the repetition rate $f_{ref}$.

The latter, as noted above, is the time in which the mirror scans back and forth between two desired angles, or among multiple angles if there are more than two. The position loop also receives input, through an Inertial Stabilization block (top left, in block entitled "DSP Software"), from an Inertial Measurement Unit ("IMU").

The function generator is designed to receive external commands from the system controller software to move the mirror with precise position-based profiles. These commands may be derived from an operator's moving a joystick attached to the video decoder, or from an algorithm within the System Controller that is instructing the mirror to step back and forth between two "look" angles (or among three or more), triggering the camera and resulting in the generation of multiple video streams that are preferably interleaved.

Velocity-Control Loop—

Angular velocity of the FSM is controlled by a velocity-control loop. The velocity of the FSM is calculated from a series of measured angular positions—and subtracted from the reference velocity given by the position controller to find the velocity error. The velocity error is used by the Velocity controller to determine how to change the current reference to the current loop. Changing the current changes torque and angular acceleration.

Current/Torque/Acceleration-Control Loop—

As detailed in the above-mentioned coowned patent applications (incorporated by reference herein), the torque and angular acceleration of the FSM is proportional to the current flowing in the FSM electrical coils. To maintain a constant current, a current-controller (also called a "torque controller") loop is implemented.

This controller measures the current in the coils by monitoring voltage across two 47 mΩ resistors that are in series with the coils. This voltage is sampled by the Analog to Digital Converter (A/D) on the DSP (see the section headed "Electrical" below). The voltage measurement is converted to a current measurement and subtracted from the reference current (generated by the velocity controller).

The current controller then updates the percent Pulse Width Modulation ("PWM"). This PWM change causes the current in the coils to change.

Inertial Stabilization—

Inertial Stabilization is used to counter platform motion with essentially any step/sample device—the enumerated FSM, digital gimbals, liquid-crystal steering, MEMS, or gimbal-less two-axis micromirrors; and in greatest likelihood any other device that may come to our attention in the future. The above-mentioned IMU (also called, elsewhere in this document, the "3-axis gyro") is used to measure angular velocity.

The inertial-stabilization module uses these three angular-rate measurements and three acceleration measurements to provide corrections of the angular position reference flowing to the position loop. This action commands the angular position of the mirror to counteract the detected body motion, so that the mirror continues to select the same subscene location—i. e., to point (or "address") the imaging sensor to that same absolute location on the earth, even after the sensor itself and its platform (such as an unmanned airborne vehicle) have moved.

Electrical:

The FSM electrical architecture consists of three major components: the FSM DSP board (FIG. 5), the FSM Mirror and Coils, and the FSM PSD Board. The system interfaces with an external computer for pointing control, status and tuning. An external battery powers the system.

Figure 6:
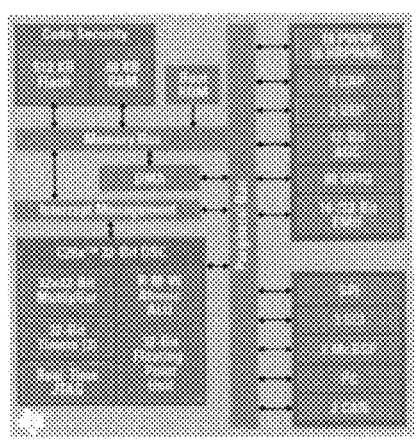
FIG. 6 is a block diagram of the architecture of a commercially available digital signal processor ("DSP"), Texas Instruments model TMS320F28335, that we now prefer to use.

Embedded Design:

For our FSM implementation, the embedded design consists of a classical embedded system based on a single-chip floating point Texas Instruments DSP. A single board (FIG. 6) provides the computing, analog, power, interface, and driver subsystems. The board interfaces with the FSM PSD board, FSM coils, FSM IMU, system power, camera triggers and external host computer communications.

The DSP (model TMX320F28335) is a floating-point version of Texas Instrument's TMS320C2000™ digital signal processors (DSPs). Some abbreviated specification sheets are appended in this document, to provide functional and generic descriptions of these processors and some other modules that we mention. It will be understood that the mentioned modules merely are devices that we currently prefer, and that many alternatives are available as to specific hardware—and indeed, more broadly, as to relatively straightforward engineering alternatives to the circuitry and system concepts that we describe here.

Figure 4:
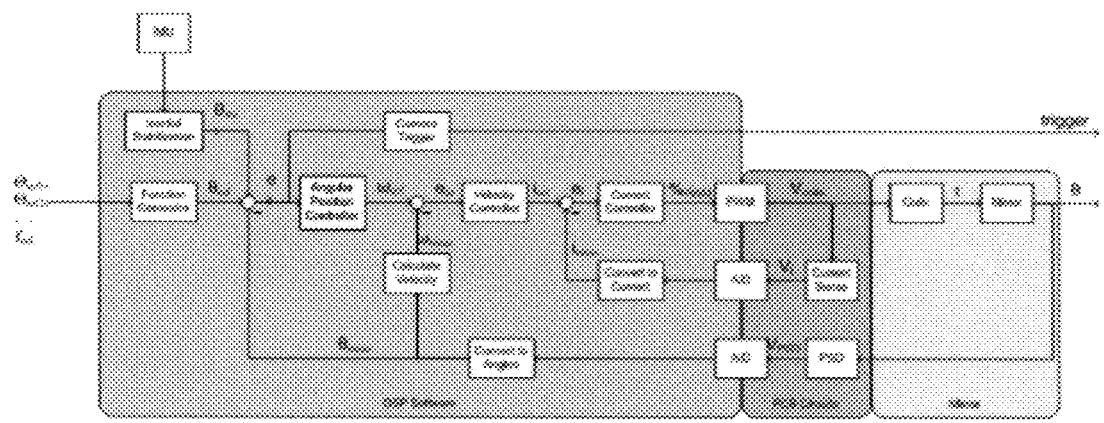
FIG. 4 is a flow diagram of the control algorithm that we prefer to use in the system with the FSM.

The DSPs in the F283x family of devices add a floating-point architecture that operates at speeds up to 150 meghertz (MHz) and can perform up to 300 MFLOPS (million floating-point operations per second)—with internal architecture as shown (FIG. 4). The unit contains 512 kbytes of flash memory for cod and 68 kbytes of data RAM.

On-chip peripherals include an extremely fast 12-bit ADC that handles up to sixteen channels, a memory interface that is configurable for either sixteen or thirty-two bits, and pulse-width modulator ("PWM") outputs that include six high-speed PWMs, used to drive the FSM coils in PWM mode. Other key interfaces used in the FSM system include a Serial Peripheral Interface ("SPI") for the IMU and onboard D/A devices, Serial Communication Interfaces ("SCI") for communication with external host computers, and several dozen or even several hundred physical I/O pins used to interface to the system. Power generation is provided by several high-efficiency switching power devices.

Unregulated d. c. power is filtered and regulated to a +5 Vdc power bus. Unregulated power is also converted to +12 Vdc for operation of the camera electronics. The +5 Vdc bus is further regulated and sequenced to provide power to the onboard electronics. All power systems have been designed for high efficiency and operation over the specified FSM temperature range.

An RS232 serial interface is provided for command reception from the host computer (Section 3.3.1 for more system-command details). Accompanying the serial interface is a trigger output that can provide sensor triggering based on the properties of the motion controller. This is used to trigger the camera when given conditions occur in the control system.

PWM and Linear Amplifier, and Current Sensing:

Power is delivered to the FSM coils by two methods: for high-power, rapid-slew-rate operation, a highly integrated dual-bridge driver is used; for low-power applications, a conventional linear amplifier (not shown in FIGS. 5 and 6) is used instead. The high-power configuration uses the L6206, a double-diffused metal-oxide semiconductor ("DMOS") dual-full-bridge PWM driver. It combines isolated DMOS power transistors with CMOS and bipolar circuits on the same chip. The L6206 features thermal shutdown and a non-dissipative overcurrent detection on the high-side power MOSFETs, plus a diagnostic output to implement overcurrent protection. The L6206 is capable of producing 5.2 A at operating frequency up to 100 kHz.

When the power system is driven in PWM mode, current sense is provided by two AD8206 difference amplifiers. The AD8206 amplifies small differential voltages in the presence of large common-mode voltages (PWM output voltages). When the power system is driven by a linear amplifier, that amplifier is used in a transconductance configuration. An SPI interface drives the linear amplifier (not shown in FIGS. 5 and 6) and programs a desired current.

IMU:

This section is applicable, at least to some degree, to all the fast stepping/directing devices discussed in this document—not only the FSM. In the several forms of our invention, LOS stabilization is provided by an Analog Devices MEMS-based Inertial Measurement Unit ("IMU"), model ADIS16355.

The IMU sensor supplies reference signals for angular rate and acceleration of the platform to which the FSM is attached. These signals are applied by the control system (FIG. 4) to steer the mirror, and thereby inertially stabilize the LOS for the imaging sensor or laser that is attached to the FSM system.

A particular critical objective of including IMU function in our invention is to specify absolute location—on (or above) the Earth, of each subscene. Such specificity enables the system to connect all the images from that location to one another for display as a continuous motion picture, even when the camera and vehicle have moved over great distances (as is most commonly the case).

The ADIS16355 is a complete triple-axis gyroscope and triple-axis accelerometer inertial-sensing system. This sensor combines MEMS and so-called "mixed signal processing" technology (i. e., handling digital and analog signals together) to produce a highly integrated solution that provides calibrated, digital inertial sensing.

An SPI interface and simple output register structure allow for easy access to data and configuration controls. The SPI port provides access to these embedded sensors: X-, Y- and Z-axis angular rates; X-, Y-, and Z-axis linear acceleration; internal temperature; power supply; and auxiliary analog input.

The inertial sensors are precision aligned across axes, and calibrated for offset and sensitivity. An embedded controller dynamically compensates for all major influences on the MEMS sensors, thus maintaining highly accurate sensor outputs without further testing, circuitry, or user intervention. These programmable features simplify system integration: in-system autobias calibration, digital filtering and sample rate, self-test, power management, condition monitoring, and auxiliary digital input/output. This compact module is approximately a 23 mm cube.

Interfaces:

FSM software, on the DSP, services interfaces to these devices:
1. analog-to-digital converters (PSD and current-sense measurements),
2. PWM and H-Bridge driver (set current flowing in coils),
3. SPI interface to the IMU,
4. multichannel buffered serial port ("MCBSP") interface to DACs on feedback board used to turn on/off external lasers,
5. serial interface to command computer (and camera),
6. general-purpose input and output ("GPIO") interface with camera trigger.

Processes:

The FSM software has many processes running on the DSP. When the DSP is first started, the system is initialized in its main process. During this startup the interfaces are initialized first. Next, external devices and timers are started; finally the other processes are initialized. The communication processing then takes over the main "while" loop—which interprets messages from the command computer.

During the control-loop processes, all functions of these loops operate. First a setpoint is created in the function generator, using inputs from the user (through the communication process). The setpoints and measurements are then passed on to the position loop, velocity loop, and current (torque) loop.

An inertial-stabilization process measures platform motion based on the IMU measurements, and modifies the reference used by the control-loops process. The A/D measurements are received on a timer.

These values are then stored and averaged for use by the control-loop processes. IMU measurements are received on an external interrupt generated by the IMU. These values are then stored for use by the inertial-stabilization process.

Figure 5:
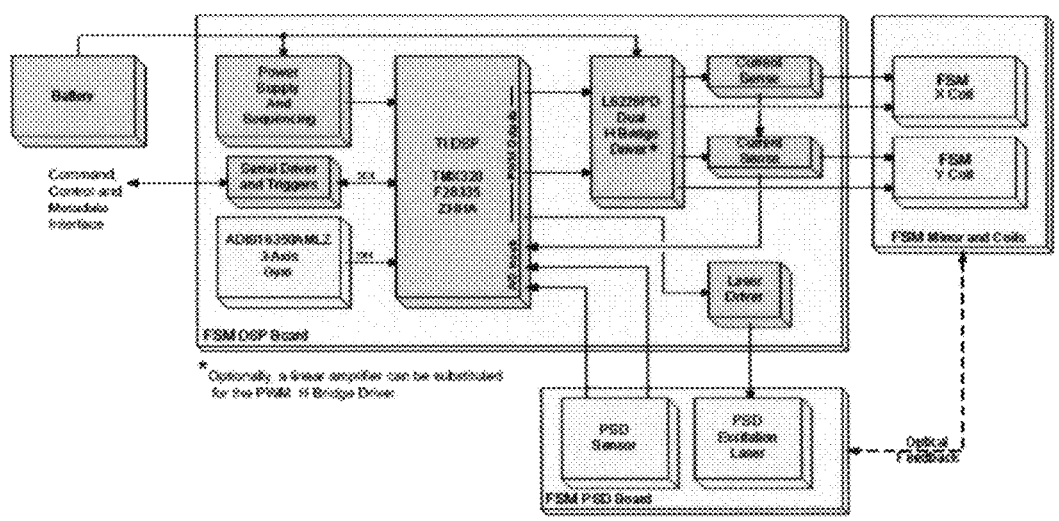
FIG. 5 is a diagram of the FSM electrical architecture.

System Operation:

The Controller System of our invention is controlled and initialized by the external Command, Control and Metadata interface (FIG. 5). As suggested in the introduction to the earlier "System Architecture" (with an FSM) section, the Video Decoder may or may not be present in the system.

It is possible to configure a system in such a way that the Video Decoder/Command and Control Computer is distributive, i. e. with command and control performed by one computer and Video Decoder functions performed by another. For the sake of simplicity in other parts of this document it is assumed that a Video Decoder/Command and Control Computer is connected to the Controller of our invention and handles system operation.

Operation of a Single Video Stream—

Generation of a single video stream is the simplest form of operation. The Video Decoder/Command and Control Computer simply sends commands to our Control System to perform these functions:
configure the mode of operation: single video stream,
steer the FSM, generating the "look" angles,
adjust camera parameters,
read and display camera and control-system parameters.

Operation of Multiple Video Streams—

When the Sensor of our invention is to generate multiple video streams, the control system instructs the FSM to move to a specific subscene and trigger the camera to take a picture. This process is performed repeatedly, generating an interleaved succession of images—one such succession for each subscene. The video-decoding system receives the resulting plural successions of images and recreates a video image for each selected subscene.

In Multiple Video Stream mode, the Video Decoder/Command and Control Computer sends commands to our Control System to perform these functions:
configure the mode of operation: multiple video streams, and the number of streams,
steer the FSM look angles for each video stream,
adjust camera parameters,
read and display camera and control-system Parameters.

Mosaic Generation—

When the SimulView sensor is to generate an array of still images, the control system instructs the FSM to move to specific subscene locations in turn, triggering the camera to take pictures. The Video Decoder/Command and Control Computer receives the resulting succession of images, together with metadata containing pointing information for each image, and then, based on the metadata, either stores the images or creates a mosaic of the images.

In the Mosaic Generation mode, the Video Decoder/Command and Control Computer sends commands to our Control System to perform these functions:
1. configure the mode of operation: mosaic generation mode,
2. configure step size and step rate, 3. adjust camera parameters,
4. read and display camera and control-system parameters.

Combined Video Streams and Mosaic Generation—

It is possible to combine the operation of single and multiple video streams, with the array of still images providing motion video for subscenes of interest, and wide-field-of-view arrays of still images that may be formed or disposed together as one or more mosaic images. In this case configurations for both multiple video streams and mosaic operation must be configured.

In the Combined Video Stream and Mosaic Generation mode the Video Decoder/Command and Control Computer sends to our Control System commands to perform these functions:

1. configure the mode of operation: combined video stream and mosaic generation mode,
2. steer the FSM look angles for each video stream,
3. configure step size and step rate,
4. adjust camera parameters,
5. read and display camera and control-system parameters.

SimulView Controller Command Summary Position Message:

The angular-position message is sent in a conventional fashion, with a conventional protocol. The checksum is calculated conventionally, preferably using a Fletcher Checksum algorithm as described in the Network Working Group's Request for Comments ("RFC") 1146.

The position message (ID=3) that is sent from the Command and Control Computer to the System Controller of our invention contains the locations of all the subscenes to be imaged. Each point or subscene is described using two floating-point data groupings ("floats") that represent the angle of each axis in milliradians. In this package the number of points is easily expanded by simply adding another set of coordinates (e. g., at the end). The System Controller decodes the number of points based on the size of the packet.

Different Stepping/Sampling Devices:

We conclude with notes, below, on the above-mentioned devices that we have investigated for use in stepping among subscenes and assembling the subscene imagery into an interleaved single image stream. The characteristics of these devices are critical to the practicality of the corresponding various forms of our invention.

"Digital Gimbals"—Electronically Steered System—

Figure 7:
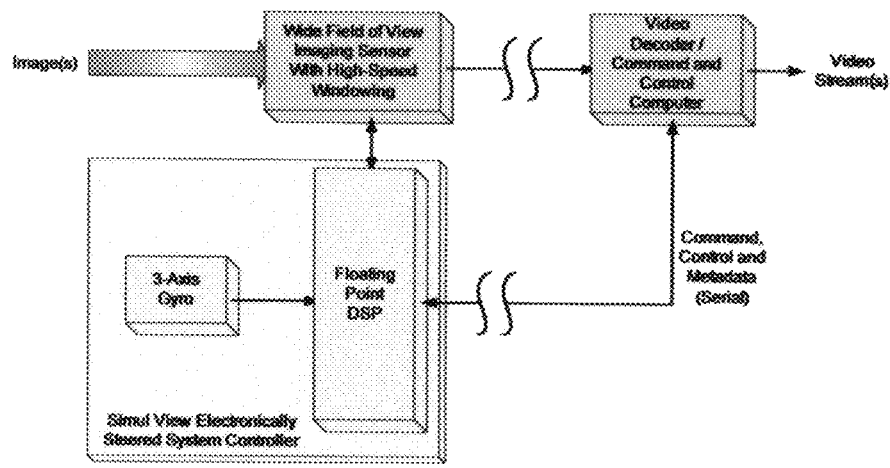
FIG. 7 is a block diagram like FIG. 3 but for a directing device that is electronically steered—incorporating wide field-of-view ("FOV") optics. a wide-FOV high-speed windowing sensor, and the SimulView System Controller.

In one alternative embodiment of our invention, the system consists of three components (FIG. 7): wide field-of-view ("FOV") optics, a wide-FOV high-speed windowing sensor, and our SimulView System Controller. Wide-FOV imaging sensors that are capable of high-speed windowing can emulate the characteristics of the FSM when the sensor's optical bandwidth and FOV are suitable for the application.

Such a sensor can be found in the Aptina model MT9J001[1]. When coupled with wide-FOV optics, this sensor is capable of viewing a wide area, for example 100 degrees horizontal by 56 degrees vertical. Windowing controls within the sensor's onboard electronics allow a subsection of the entire image to be sampled and read out on a frame-by-frame basis.

If a conventional video frame size (640 by 480 pixels) is used with our example optics, a frame may be sampled anywhere within the 100°×56° FOV of the sensor. This particular configuration would generate a frame that represents 16.6° horizontal by 12.5° vertical. Pointing resolution (in this example) would be 0.026 degree.

A sensor such as the Aptina MT9J001 is able to change the window's position within the 100° by 65° video frame update interval (typically ⅓ msec). This product of Aptina Imaging Corporation unit is a 1/2.3-inch 10 Mpixel CMOS digital image sensor. By alternating the window's position (as we move the mirror's position in the FSM-based case) the system can generate multiple video streams.

Figure 8:
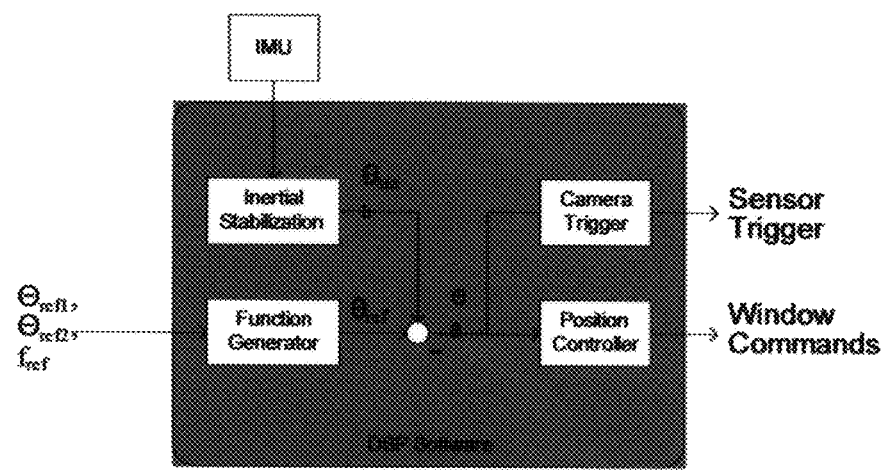
FIG. 8 is a control-algorithm flow diagram like FIG. 4, but for the FIG. 7 electronically steered ("digital gimbals") forms of the system.
Figure 9:
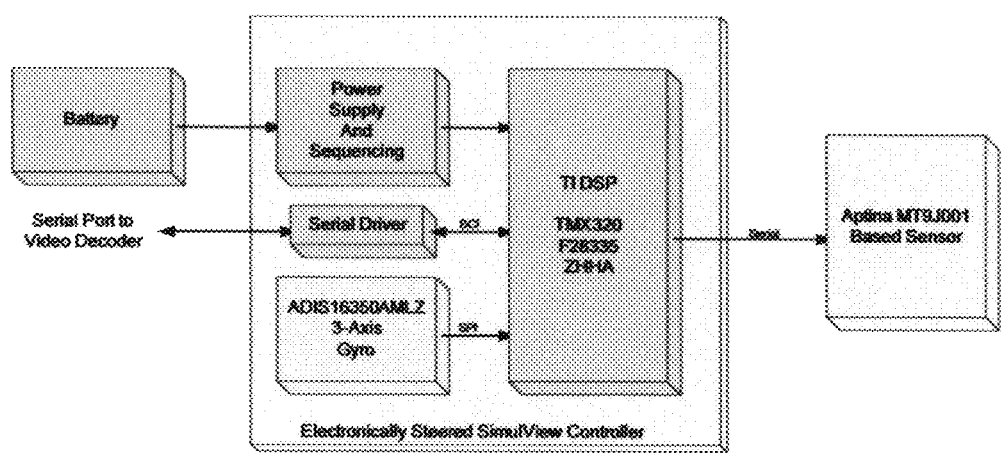
FIG. 9 is an electrical-architecture diagram like FIG. 5, but also for the FIGS.-7 and -8 electronically steered forms of the invention.
Figure 10:
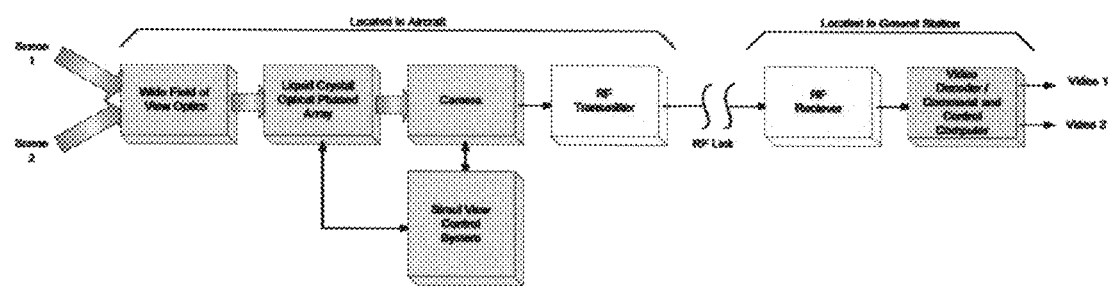
FIG. 10 is a diagram like FIGS. 4 and 8, but for a liquid-crystal steering system.

When a sensor such as the Aptina MT9J001 is combined with the Electronically Steered System Controller, and the Video Decoder/Command and Control Computer of our invention, the system behavior is nearly identical to the FSM-based system. We show a high-level view (FIG. 8) of our electronically steered control-system software, running on the floating-point DSP of our System Controller and implemented in hardware.

Fast Scanning Mirror ("FSM")—

Figure 13:
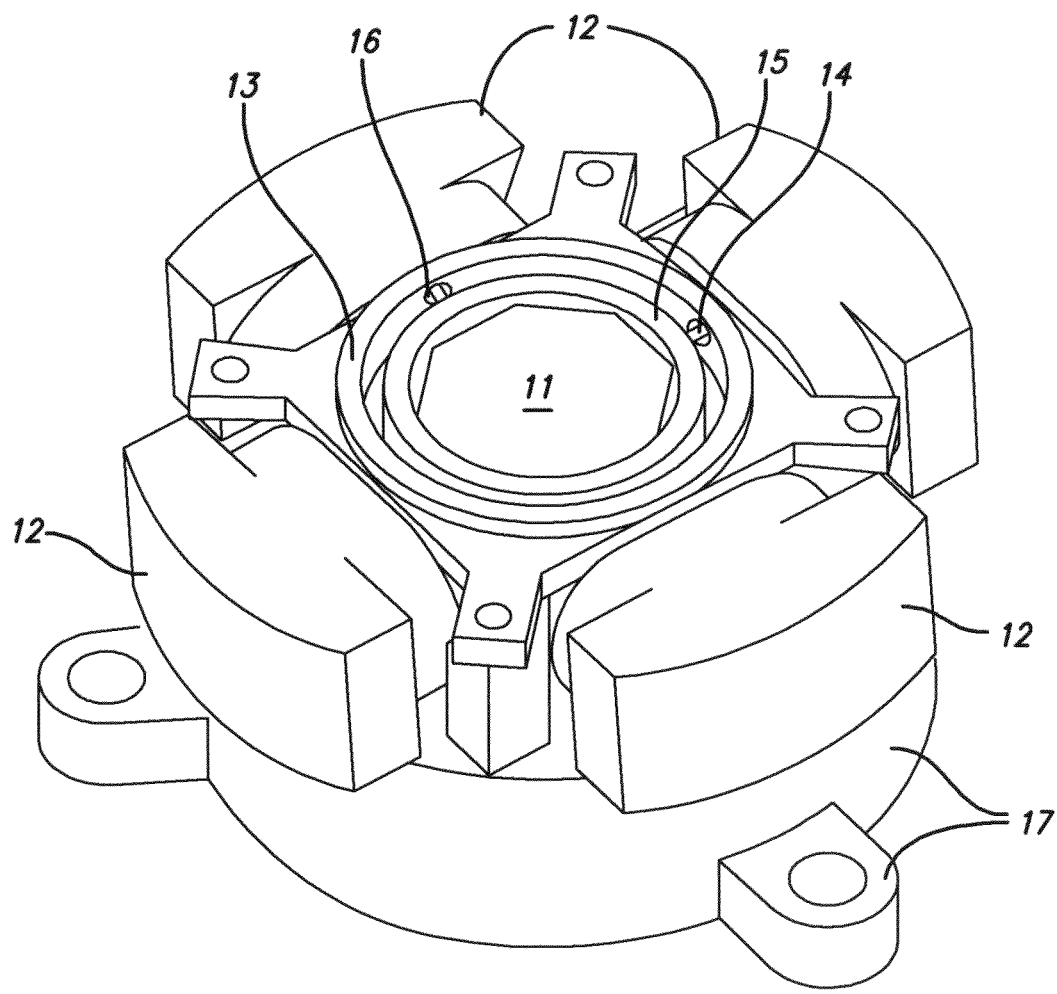
FIG. 13 is a substantial copy of FIG. 1 from the previously mentioned FSM patent application, and is an isometric view of the FSM with its external magnets and drive coils.
Figure 14:
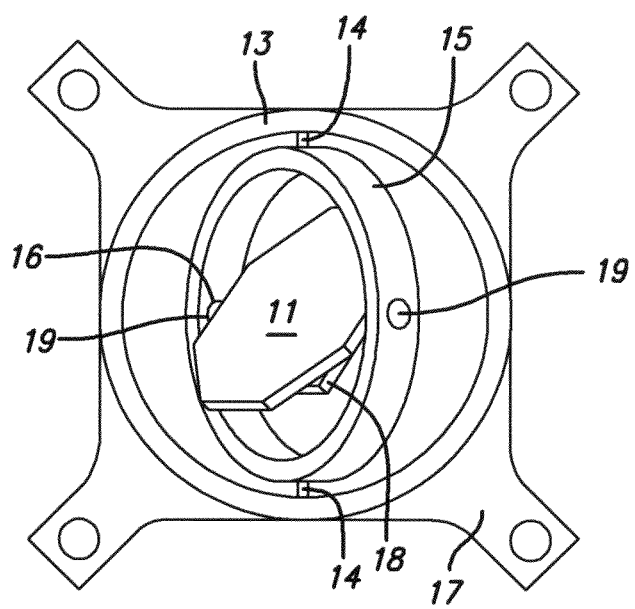
FIG. 14 is likewise a substantial copy of a figure (FIG. 4A) from the FSM application, and shows a like view of the device—but with the external components removed to show only the internal self-gimbaled mirror.
Figure 15:
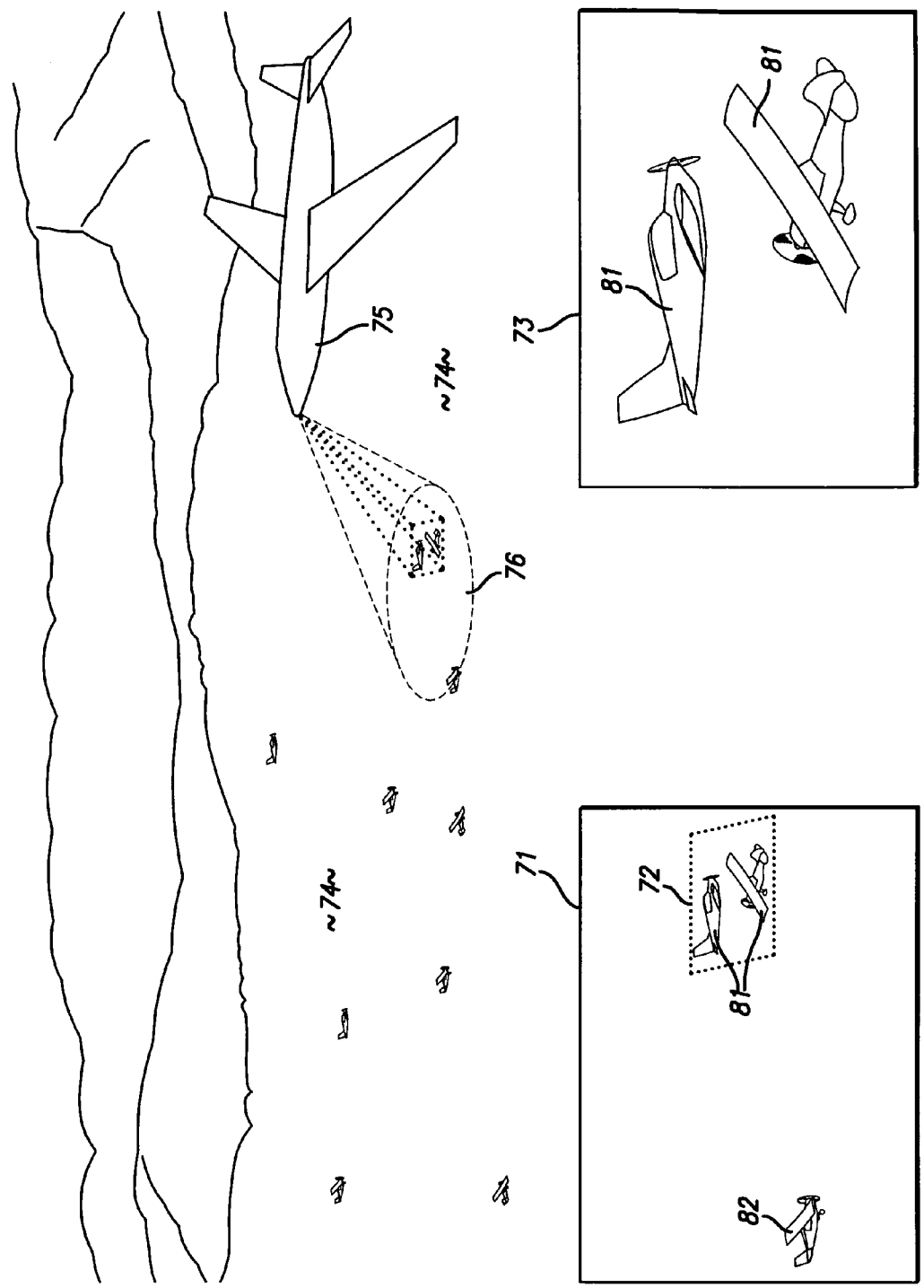
FIG. 15, too, is a substantial copy of a drawing (FIG. 17) from the FSM application—and represents a composite perspective view of the mirror in ISR field operations, used as a "roving foveal camera" such as mentioned earlier, capable of simultaneously generating a wide-FOV (or wide-FOR) image and a narrow-FOV image (see inset view)—both at high resolution—with the corresponding narrow-FOV image inset into the wide-FOR (or wide-FOV) image, making a composite output view.

Following here are extended excerpts from the above-mentioned '171 patent application:

This invention provides a small, low-friction steering mirror [FIGS. 13 and 14] that can scan, very rapidly in two orthogonal directions—on jewel bearings or equivalent. In performance terms, for most comparisons, equivalents to jewel bearings include bearing surfaces made of ceramic and other refractory materials.

For purposes of this document, the term "refractory" adheres to conventional definitions in engineering etc., namely materials that are difficult to work, or that are extremely hard, or sometimes that have a high melting point or are "difficult" to melt. Accordingly, refractory bearings include, without limitation: ceramics, cast materials such as used in making tiles and furnace linings, some types of concrete or cement, gemstones, synthetic gems (including original Hart artificial diamonds), and other tough minerals. A related class of potentially useful materials is refractory metals such as tungsten, molybdenum and alloys.

Most such materials can be cast or otherwise formed by various techniques. Vapor deposition appears particularly promising.

Current-day websites with details about low-friction coatings include, among others—

Composite Diamond Coatings:
enduracoatings.com/prod1100f.asp
enduracoatings.com/prod1100b.asp
Thin-Film Coatings:
pvd-coatings.co.uk/MoST-coating.htm
industrialcoatingsworld.com/Low-Friction-Coatings/Vapor-Deposition-Low-Friction-Coatings.html
industrialcoatingsworld.com/Low-Friction-Coatings/Dry-Film-Lubricants-Low-Friction-Coatings.html
and:
suncoating.com/molykote.html.

(As will be understood, in a web browser any one of these URLs must be entered all in one continuous line, e. g. with no line break between "Coatings/" and "Vapor".)

For example, the PVD site discusses molybdenum disulphide, said to have "an ultra low coefficient of friction (0.01-0.06)". As another example, the "EnduraCoatings" links relate to composite diamond coating.

In this patent document it will be seen that friction is a very important and rather complicated topic for best practice of certain embodiments of our invention. For full enabling disclosure of the best modes of practice, that topic [is] taken up in considerable detail, in . . . sections of [the original FSM patent-application] document.

Scanning is very fast, because the control bandwidth in one or both rotational axes is on the order of twice that attainable with proposed systems of Bernstein (Draper Corporation), which are based on monolithic silicon construction and have unitary torsional springs as flexures. Hence our steering mirror can be used for extremely rapid and accurate generation of an optical raster, or object tracking.

Furthermore if desired this invention can be implemented with zero rotational restoring force, so that rotational position tends to be quite stable without application of large continuing positional force. For maximum excursion we prefer to drive the mirror magnetically as detailed below; however, other rotational drive arrangements are readily available.

Microelectromechanical Mirrors or Arrays—

Figure 11:
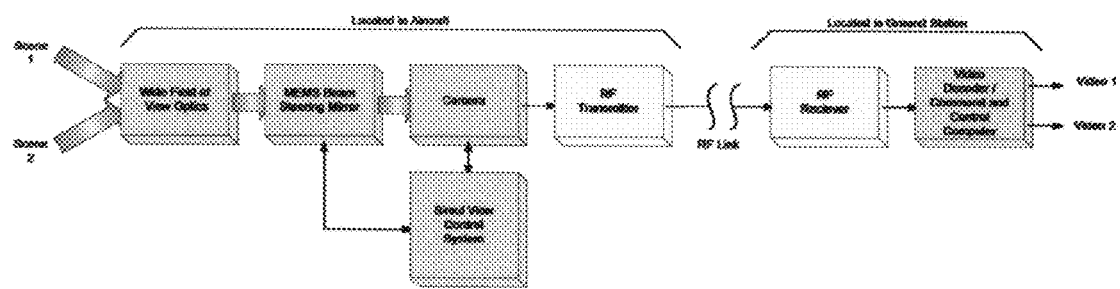
FIG. 11 is another like diagram, but for a MEMS-mirror steering system.
Figure 12:
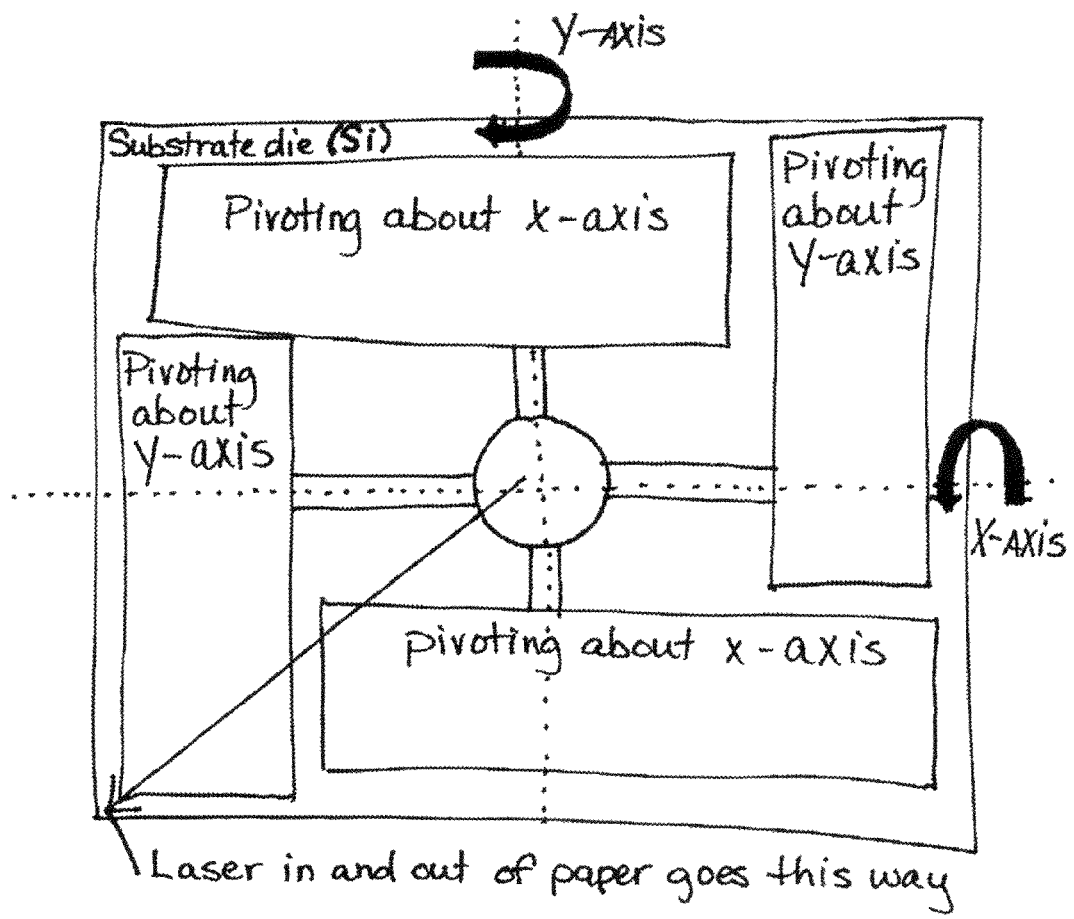
FIG. 12 is still another like diagram, but for a gimbal-less two-axis scanning-micromirror system (such as those of Adriatic Research)

MEMS mirror technology can be used as the fast stepping/sampling device in our invention. FIG. 11 shows the system configuration using this option. As MEMS mirrors alone have a FOR of only a few degrees, wide-FOV optics must be placed in front of the MEMS unit or units to provide a useful FOV. This form of our invention is very similar to the FSM-based system, but with a control system capable of driving the MEMS mirror or mirrors.

Liquid-Crystal Optical Phased Arrays, Used as Fast Beam-Steering Devices—

These devices are new, and in a preliminary scientific-development stage. LC optical phased arrays basically are diffractive devices, calling for relatively sophisticated control systems. Moreover, like the MEMS systems discussed just above, they have a limited FOR (understood to be in the range of 1 to 5 degrees) and therefore require wide-FOV front-end optics.

Nevertheless on a longterm basis LC optical phased arrays are definitely appealing for use as a light-deflecting component of our invention, given that they have no moving parts. They can therefore be made exceedingly robust against vibration, dust and other threats to dynamic machinery—a very positive virtue for UAV deployment, among other rough field environments. These devices also show promise of being, when fully developed and designed, fast steering components, with response times on the order of 1 to 5 (or perhaps 1 to 10) milliseconds.

Gimal-Less Two-Axis Scanning Micromirrors—

These devices, of Adriatic Research, are similar in construction and operation to the MEMS mirrors and arrays discussed above. Accordingly we believe that use of these scanning micromirrors in our invention offers similar advantages, but is subject to the same limitations, as the MEMS units. Their step response for somewhat midsize units (e. g. 4 mm across) is roughly one millisecond.

Roving Foveal Simulview Sensor:

It is noted in the "BACKGROUND" section of this document that the "roving foveal camera" is subject to the limitation of a very small number of concurrent views—in a very small number of directions. By the same token, however, our own basic "SimulView" sensor is subject to the limitation of essentially an invariant focal-length system.

Accordingly our present invention encompasses a merging of these two principles of innovation. In this form of our invention, for example one or both of two separate basic receiving optics (with variable focus, as in the roving foveal camera) is provided with a simultaneous viewing capability—that is, with:

(1) some form of fast stepping/steering device (FIG. 16); and
(2) synchronization of the corresponding imaging sensor with the motions of that mirror, so that each of the two different variable-focal-length subsystems is capable of generating plural video streams.

The converse is also possible, and perhaps more practical—that is, for a SimulView subsystem having variable focal lengths to switch not only image-frame reception (in synchronism with the steering-mirror operations) but to switch focal lengths, too. Thus, benefits of our simultaneous-viewing invention can be extended to picking magnification/minification that best suits the chosen subscene, and its corresponding viewing direction and distance.

It is also within the scope of our invention to provide more than two sets of basic receiving optics (with variable focus), so that the optical path is split (e. g. by a half-silvered beam splitter or chopper mirror) not once but twice or more. This form of our invention affords a choice of several or even many programmable combinations of:

highly diverse focal properties (and concomitant areal coverages), and several or many pointing directions (with concomitant dwell times in each direction).

People familiar with this field will now readily understand and appreciate that attainment of such multicombination capability can be achieved by following disclosures and instructions in the separate patent document on the roving foveal camera, to establish plural focal lengths in different views; and for each (or as many as desired) of those separate views, also following disclosures and instructions in the present document to establish a greater number of concurrent viewing directions.

A particular challenge to this form of the present invention resides in the relatively very slow operation of electrically controllable focusing devices (such as liquid lenses)—more than two order of magnitude slower than the subscene-selection mechanisms of our invention. Needing exploration are various mitigating mechanisms such as, possibly, ordering subscenes by distance from the sensor, so that focal shifts are all small fractions of the total photographic distance.

The foregoing disclosures are exemplary, not exhaustive or limiting. The character and scope of our invention are to be determined from the appended claims.

We claim:

1. A method for acquiring and displaying substantially simultaneous motion-picture images of plural portions of a scene, using substantially only a single imaging sensor and a fast electrooptical directing device; said method comprising the steps of:

automatically operating the fast electrooptical directing device, stepwise, to acquire an interleaved sequence of plural subscene images, thereby subdividing the scene into the plural subscene images;

recording the interleaved sequence, as a single series of images, for subsequent use;

transmitting the interleaved sequence, as a single series of images, via only a single data link with no required parallel path, for subsequent use;

automatically sorting the recorded single interleaved image sequence into corresponding plural noninterleaved separate sequences of images, including substantially a separate sequence for each subscene; and separately displaying each of the plural separate sequences respective motion-picture images of the subscenes.

2. The method of claim 1, wherein:

the operating step comprises operating the fast electrooptical directing device to yield a new image, for interleaving, approximately each five to forty milliseconds or faster.

3. The method of claim 1, wherein the fast electrooptical directing device is a fast scan mirror with refractory bearings ("FSM"), wherein:

the operating step comprises operating the FSM to direct to the sensor a new image, for interleaving, approximately each five to forty milliseconds.

4. The method of claim 1, wherein the fast electrooptical directing device is an electronically steered, high-speed windowing sensor ("digital gimbal"), wherein:

the operating step comprises operating the digital gimbal to direct to the sensor a new image, for interleaving, approximately each twenty-five to forty milliseconds or less.

5. The method of claim 1, wherein the fast electrooptical directing device is a microelectromechanical ("MEMS") steering mirror or array, wherein:
the operating step comprises operating the MEMS steering mirror or array to direct to the sensor a new image, for interleaving, approximately each one to five milliseconds or less.

6. The method of claim 1, wherein the fast electrooptical directing device is a liquid-crystal beam-steering device, wherein:
the operating step comprises operating the liquid-crystal beam-steering device, to direct to the sensor a new image, for interleaving, approximately each one to five milliseconds or less.

7. The method of claim 1, wherein the fast electrooptical directing device is a gimbal-less two-axis fast scanning mirror, wherein:
the operating step comprises operating the gimbal-less two-axis fast scanning mirror to direct to the sensor a new image, for interleaving, approximately each one millisecond or less.

8. The method of claim 1, wherein:
there are two subscenes;
the operating step comprises subdividing the scene into a sequence of images, alternating between the two subscenes; and
the sorting step comprises sorting the alternating sequence into two nonalternating sequences, including a separate sequence for each subscene.

9. The method of claim 1, wherein:
there are "n" subscenes, n being a positive integer equal to two or greater;
the operating step comprises subdividing the image data into a sequence of images, stepping, in turn, among the n sub-scenes; and
the sorting step comprises sorting the interleaved image sequence into n noninterleaved image sequences, including a separate sequence for each subscene.

10. The method of claim 1, wherein the subscenes are in mutually different viewing directions; and further comprising the step of:
for each subscene, synchronizing each change of viewing direction with image frame reception by the stepping optical device.

11. The method of claim 10, further comprising the step of:
for each subscene, synchronizing each change of viewing direction with a change in focal length as appropriate for distance to the subscene.

12. Apparatus for acquiring and displaying substantially simultaneous motion-picture images of plural portions of a scene; said apparatus comprising:
substantially only a single imaging sensor;
at least one stepping device that is a fast electrooptical directing device to direct to the sensor plural subscene images from corresponding different viewing directions;
means for providing the subscene images, via a single data link with no required parallel path, as a single series of images;
means for automatically sorting the provided single series of images into corresponding plural noninterleaved separate sequences of images, including substantially a separate sequence for each subscene; and
means for separately displaying each of the plural separate sequences as respective motion-picture images of the sub-scenes.

13. The apparatus of claim 12, further comprising:
means for introducing variation in focal length; and
means for operating the introducing means in synchronism with operation of the stepping optical device, as appropriate for distance to each new subscene.

14. Apparatus for acquiring and displaying substantially simultaneous motion-picture images of plural portions of a scene; said apparatus comprising:
a single imaging sensor;
a fast image-directing device automatically addressed to successively different viewing directions, to intercept and direct to the sensor a series of successive images of, or successive signals representing images of, scene portions from said different viewing directions respectively;
wherein the sensor responds with a series of successive signals representing the successive images; and
means for mounting the sensor and device in a vehicle;
wherein the fast image-directing device directs to the sensor images for interleaving, and is selected from the group consisting of:
a fast scan mirror ("FSM") to direct to the sensor a new image approximately each five to forty milliseconds or less,
an electronically steered, high-speed windowing sensor ("digital gimbal") to direct to the sensor a new image approximately each one hundred to two hundred microseconds or less,
a microelectromechanical ("MEMO") steering mirror or array, to direct to the sensor a new image approximately each one to five milliseconds or less,
a liquid-crystal beam-steering device having no moving parts, to direct to the sensor a new image approximately each one to five milliseconds or less, and
a gimbal-less two-axis fast scanning micromirror, to direct to the sensor a new image approximately each one millisecond or less.

15. The apparatus of claim 14, further comprising:
means, responsive to the signals, for separately displaying each of the plural separate signal sequences from said sensor as respective motion-picture subscene images at the different directions.

16. The apparatus of claim 14, wherein said fast steering mirror has:
refractory bearings, and
electromagnetic controls for setting the viewing directions of the addressed device in successive frames.

17. The apparatus of claim 14, further comprising:
means for also forming a mosaic from the acquired scene portions.

18. The apparatus of claim 14, wherein:
the vehicle is an airborne vehicle.

19. The apparatus of claim 14, wherein:
the vehicle is unmanned.

* * * * *